(12) United States Patent  (10) Patent No.: US 9,527,511 B2
Peterson  (45) Date of Patent: Dec. 27, 2016

(54) POWERTRAIN STALL ENGINE SPEED CONTROL (71) Applicant: Caterpillar Inc., Peoria, IL (US)

(72) Inventor: Grant Steven Peterson, Metamora, IL (US)

(73) Assignee: Caterpillar Inc., Peoria, IL (US)

( * ) Notice: Subject to any disclaimer, the term of this patent is extended or adjusted under 35 U.S.C. 154(b) by 931 days.

(21) Appl. No.: 13/633,583

(22) Filed: Oct. 2, 2012

(65) Prior Publication Data
US 2014/0095048 A1 Apr. 3, 2014

(51) Int. Cl.
B60W 30/18 (2012.01)
B60W 50/14 (2012.01)
B60W 10/06 (2006.01)
B60W 30/188 (2012.01)

(52) U.S. Cl.
CPC ........ *B60W 30/18009* (2013.01); *B60W 50/14* (2013.01); *B60W 10/06* (2013.01); *B60W 30/1884* (2013.01); *B60W 2300/17* (2013.01); *B60W 2710/0644* (2013.01)

(58) Field of Classification Search
CPC ....... F16H 61/46; F16H 61/472; B60W 10/06; B60W 10/103; Y02T 10/76; A01D 69/025; A01D 43/105; B60L 2200/40
See application file for complete search history.

(56) References Cited

U.S. PATENT DOCUMENTS

| | | | | |
|---|---|---|---|---|
| 4,274,257 A | * | 6/1981 | Koch et al. | 60/431 |
| 6,424,902 B1 | * | 7/2002 | Kuras | 701/51 |
| 6,447,423 B1 | * | 9/2002 | Cannon | F16H 61/462 |
| | | | | 477/46 |
| 6,675,577 B2 | * | 1/2004 | Evans | 60/445 |
| 2003/0125147 A1 | * | 7/2003 | Lutgen | 475/78 |

* cited by examiner

*Primary Examiner* — Sizo Vilakazi
(74) *Attorney, Agent, or Firm* — Caterpillar Inc.

(57) ABSTRACT

A control system for controlling speed of an engine of a work machine having a hydrostatic transmission is disclosed. The control system may include a power source and a hydrostatic transmission operatively coupled to the power source. The control system may also include a controller capable of receiving information from the power source and the transmission and actively controlling an engine speed of the work machine to reduce the engine speed below a threshold value to emulate an engine lug during a stall condition.

20 Claims, 3 Drawing Sheets

POWERTRAIN STALL ENGINE SPEED CONTROL

TECHNICAL FIELD OF THE DISCLOSURE the present disclosure relates to work machines and, more particularly, relates to control systems of work machines employing hydrostatic transmissions.

BACKGROUND OF THE DISCLOSURE

Wheel loader machines are used for moving material from one place to another at a worksite. These machines typically include an engine frame structure for housing the engine and having rear wheels driven by the engine, as well as for supporting an operator station for the operator. A non-engine frame structure with front wheels is attached to the engine frame structure by an articulated connection. A pair of lift arms coupled to the non-engine frame structure are raised and lowered by corresponding lift cylinders to adjust the elevation of an implement above the ground. The wheel loader machines may be able to move many different types of materials depending on the requirements of the job site. Consequently, the wheel loader machines may be designed to manipulate different types of implements.

Conventional wheel loaders are fitted with a geared transmission. However, wheel loaders with a hydrostatic continuous variable transmission have been steadily gaining popularity. One of the reasons for switching from a conventional powershift or geared transmission to a hydrostatic transmission is the fuel economy and high mileage achieved with a hydrostatic transmission. Generally speaking, a hydrostatic transmission includes a variable displacement pump that converts rotational power from a power source into fluid flow and a motor that converts the fluid flow back into rotational motion for driving a traction device of the work machine.

Notwithstanding the advantages of a hydrostatic transmission over conventional geared transmissions, a problem with the hydrostatic transmission arises when the wheel loader machine (having a hydrostatic transmission) stalls against an inanimate object, such as, a pile of rock, clay wall, and the like. When a geared transmission is stalled (e.g., exerting substantial force into the hit object without increasing transmission output speed, which is substantially zero), the geared transmission substantially lugs the engine of the wheel loader machine, where as a hydrostatic transmission does not lug the engine at all. This engine lug provides an audible feedback to the operator that the wheel loader machine is working and/or performing to its capacity, and is pushing or pulling as much as it possibly can. Since a hydrostatic transmission does not provide this feedback, the operator may get a sense that the work machine is not doing the same amount or quality of work.

It would accordingly be beneficial if a system for a hydrostatic transmission were developed that could emulate the engine lug of the geared transmission and provide feedback indicative of same to the operator of the work machine during stall conditions.

SUMMARY OF THE DISCLOSURE

In accordance with one aspect of the present disclosure, a control system for a work machine having a hydrostatic transmission is disclosed. The control system may include a power source, a hydrostatic transmission operatively coupled to the power source and a controller capable of receiving information from the power source and the transmission and actively controlling an engine speed of the work machine to reduce the engine speed below a threshold value to emulate an engine lug during a stall condition.

In accordance with another aspect of the present disclosure, a method of operating a work machine in a stall condition is disclosed. The method may include providing an engine operatively coupled to a transmission, providing a controller capable of receiving information from the engine and the transmission and determining by the controller whether a stall condition exists. The method may also include reducing a speed of the engine below a threshold value if the stall condition exists, determining whether the stall condition has passed and ramping the speed of the engine back to a normal operating condition when the stall condition has passed.

In accordance with yet another aspect of the present disclosure, a work machine is disclosed. The work machine may include an engine, a hydrostatic transmission, a plurality of sensors capable of receiving information from the engine and the transmission and a controller. the controller may be capable of receiving information from the plurality of sensors and reducing a speed of the engine during a stall condition below a threshold value such that the reduced speed emulates an engine lug, the controller further capable of determining when the stall condition has passed and ramping up the speed of the engine when the stall condition has passed.

These and other aspects and features of the present disclosure will be more readily understood upon reading the following description when taken in conjunction with the accompanying drawings.

While the present disclosure is susceptible to various modifications and alternative constructions, certain illustrative embodiments thereof, will be shown and described below in detail. It should be understood, however, that there is no intention to be limited to the specific embodiments disclosed, but on the contrary, the intention is to cover all modifications, alternative constructions, and equivalents along within the spirit and scope of the present disclosure.

DETAILED DESCRIPTION OF THE DISCLOSURE

The present disclosure discloses a control system for a work machine employing a hydrostatic transmission. The control system is designed to control engine speed and emulate an engine lug of a geared transmission in stall conditions but within a machine employing a hydrostatic transmission. Specifically, the control system is designed to first determine a stall condition, and upon determining a stall condition, the engine lug of a geared transmission is mimicked by reducing the speed of the engine below a threshold value, as described in detail below. The engine lug provides feedback (e.g., audible feedback) to the operator of a machine having a hydrostatic transmission, similar to one having a geared transmission.

Figure 1:
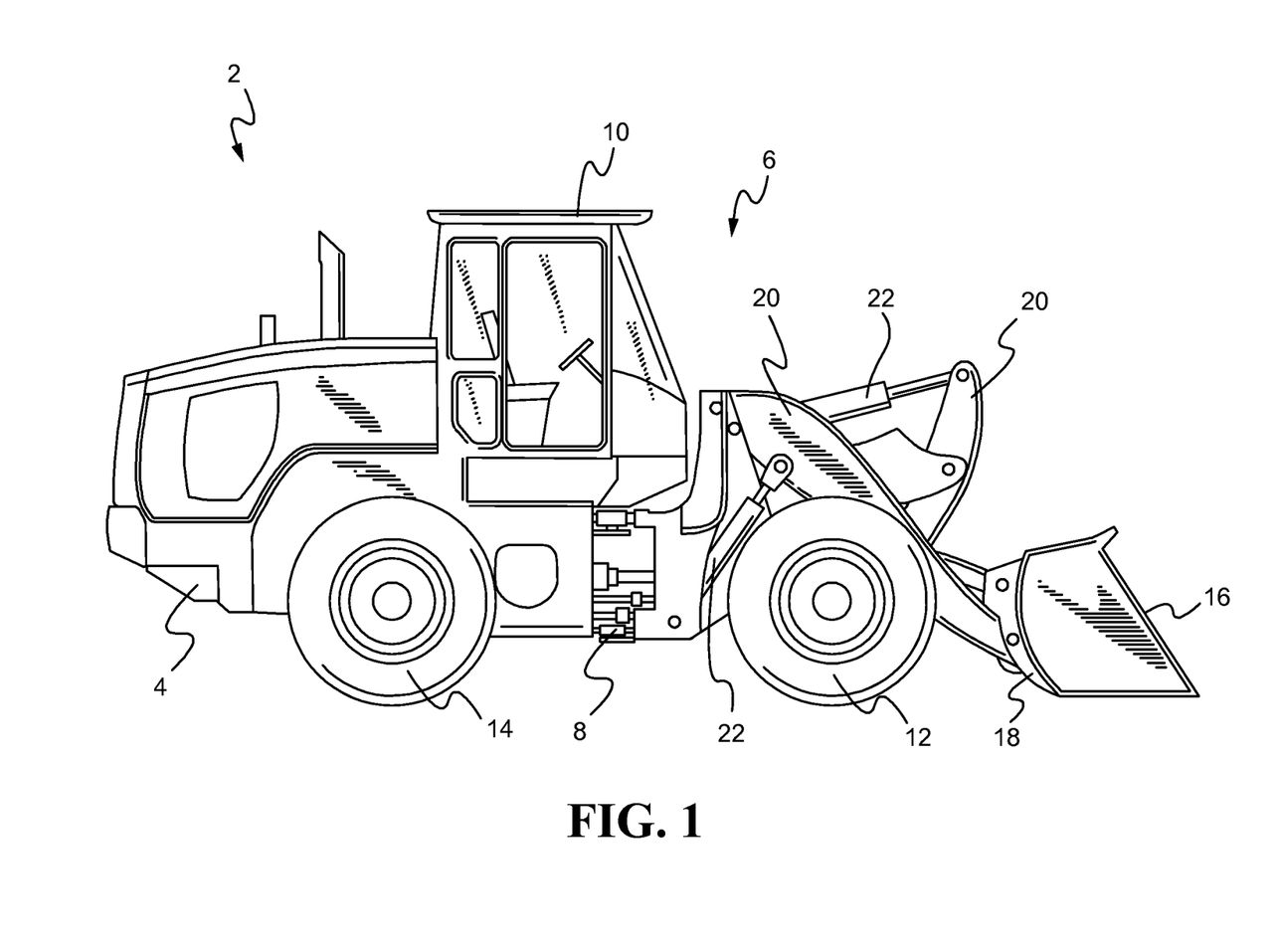
FIG. 1 is a perspective view of an exemplary wheel loader, in accordance with at least some embodiments of the present disclosure.

Referring now to FIG. 1, an exemplary work machine 2 is shown, in accordance with at least some embodiments of the present disclosure. While the work machine 2 has been shown to be a small wheel loader, it will be understood that in other embodiments, the work machine may be a skid-steer loader, a backhoe-loader, a track or wheel type tractor or loader, a harvester, a paving machine, or any other type of work, construction, agricultural or earth moving machine that utilizes a hydrostatic transmission for accomplishing a task.

The work machine 2 may include an engine frame structure 4 connected to a non-engine frame structure 6 via an articulating joint 8. An operator station 10 may be positioned substantially on the engine frame structure 4. Front wheels 12 and rear wheels 14 may be employed for navigating the work machine 2. The front wheels 12 may be turned by a steering mechanism 13 situated within the operator station 10, with the articulating joint 8 allowing the engine frame structure 4 to move from side-to-side to turn the work machine 2. In other embodiments, tracks, a combination of wheels and tracks, or any other ground engaging mechanism for navigating the work machine 2 may be employed.

The engine frame structure 4 may house a power source (such as an engine, not shown) and other power train components (such as a transmission, also not shown) for generating and delivering power to operate the work machine 2. The engine may be a gasoline, diesel, or any other type of engine that is commonly employed with such work machines. The work machine 2 may even draw power from other power sources, such as natural gas, fuel cells, etc. Relatedly, the transmission of the work machine 2 may be a hydrostatic continuous variable transmission (CVT). In at least some embodiments, other types of transmissions, such as a geared transmission may be employed in conjunction with the hydrostatic transmission.

Referring still to FIG. 1, the non-engine frame structure 6 may be employed to attach a work implement, such as a bucket 16. The bucket 16 may be mounted at the front of the non-engine frame structure 6 by way of a coupler 18. The bucket 16 and the coupler 18 may be configured for secure attachment of the bucket during use of the work machine 2, and for release of the bucket and substitution of another implement. Although the coupler 18 and the bucket 16 are illustrated and described herein as being separate connectable components, those skilled in the art will understand that each implement (including the bucket 16) may be configured as a unitary component with its own coupler component for connecting the implement to the work machine 2.

The coupler 18 may be connected to the non-engine frame structure 6 by a pair of lift arms 20. One end of each lift arm 20 may be pivotally connected to the non-engine frame structure 6 and the other end may be pivotally connected to the coupler 18. The lift arms 20 may rotate about the point of connection to the non-engine frame structure 6, with the rotation of the lift arms being controlled by corresponding lift cylinders 22 pivotally coupled to the non-engine frame structure and the lift arms. The lift cylinders 22 may be extended or retracted to raise or lower, respectively, the lift arms 20. Notwithstanding the fact that in the present embodiment, two of the lift arms 20, with each having a corresponding lift cylinder 22 have been shown and described, in at least some embodiments, a single lift arm and single lift cylinder, two lift arms driven by a single lift cylinder, or other arrangements of lift arms and lift cylinders, providing a similar functionality as described above may be implemented.

With respect to the operator station 10, although not visible, it may include a plurality of operator controls and operator interfaces for controlling the operation of the work machine 2 and the various work implements connected thereto, as well as for navigating and steering the work machine on a work surface. For instance, the operator station 10 may house various hand controlled operator interfaces, such as, joystick controls, instrument panels, gauges and warning lamps for keeping the operator aware of any critical system information, as well as safety and convenience features such as cup holders, lighters, etc. Other devices and components that commonly exist in such vehicles may be present in the operator station 10 of the work machine 2.

Notwithstanding the components of the work machine 2 described above, it will be understood that several other components of the work machine, as well as components that may be employed in combination or conjunction with the work machine are contemplated and considered within the scope of the present disclosure.

Figure 2:
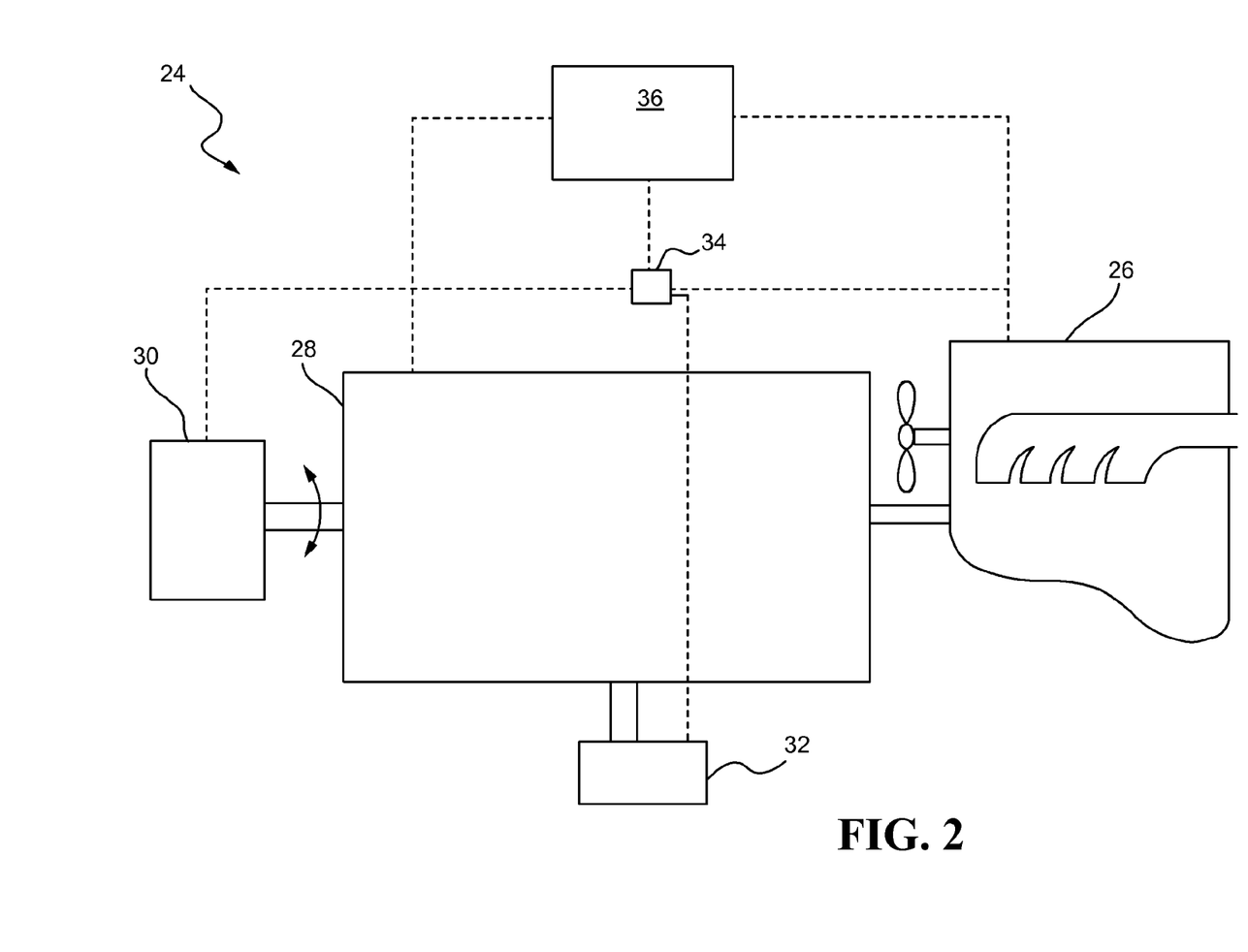
FIG. 2 is a schematic illustration of a control system employed within the wheel loader of FIG. 1.

Turning now to FIG. 2, an exemplary block diagram of a control system 24 is shown, in accordance with at least some embodiments of the present disclosure. The control system 24 is intended to control various aspects of the work machine 2, an engine speed control aspect of which is described below. As shown, the control system 24 may include a power source 26 and a transmission assembly 28 operatively coupled together to form a powertrain. The power source 26 may include, for example, an internal combustion engine, including but not limited to a spark-ignition engine, a compression ignition engine, a rotary engine, a gas turbine engine, and/or an engine powered by gasoline, diesel fuel, bio-diesel, ethanol, methanol, and combinations thereof. As mentioned above, the power source 26 may also include and draw power from a hydrogen-powered engine, a fuel cell, a solar cell, and/or any other power source that is commonly employed in work machines.

With respect to the transmission 28, it may be configured to convert rotational motion of the power source 26 into rotational motion that is used to drive a traction assembly 30. The traction assembly 30 may include at least one traction device, such as the front wheels 12 and the rear wheels 14, or any other suitable traction device, a combination of traction devices or other ground engaging means that are commonly employed in work machines. The transmission 28 may include an electrohydraulic single path hydrostatic transmission, an electrohydraulic multipath hydrostatic transmission, and/or any other transmission known to those skilled in the art.

A hydrostatic transmission may include, for example, a pump and a fluid motor that are fluidly coupled by a forward flow loop and a reverse flow loop. The pump may convert rotational motion of the power source 26 into fluid flow, and the fluid motor may convert the fluid flow back into rotational motion that is used to drive traction assembly 30. Fluid flow and pressure in the hydrostatic transmission may be servo-controlled or otherwise electronically controlled by any suitable control system. The transmission 28 may also convert rotational motion of the power source 26 into movement of an implement assembly 32. The implement assembly 32 may be used to perform a variety of tasks including, for example, digging, dumping, lifting, scraping, and other tasks by attaching and controlling various work implements, such as, the bucket 16 to the work machine 2.

The control system 24 may also include one or more sensors 34, such as, pressure sensors, engine speed sensors, transmission speed sensors, etc. The sensors 34 may be located throughout the work machine 2 and may provide signals indicative of parameters related to the power source 26, the transmission 28, the traction assembly 30, the implement assembly 32, as well as other work machine components. For example, the sensors 34 may provide signals indicative of the fluid pressure (e.g., the forward drive pressure and the reverse drive pressure), fluid temperature, displacement, speed, and/or any other suitable operating parameters of the transmission 28. The sensors 34 may also be operable to provide signals indicative of operating parameters related to the power source 26, including, for example, the engine speed. The sensors 34 may collect such information and may convey that information in the form of signals to a controller 36. The signals conveyed by the sensors 34 may be in the form of digital, analog, mechanical, and/or hydraulic signals.

The controller 36 may be operatively coupled to and receive information from the power source 26, the transmission 28, the traction assembly 30, the implement assembly 32 and/or the sensors 34. The controller 36 may also receive information from other components of the work machine 2. The controller 36 may be configured to control operation of the various components of the work machine 2. For example, the controller 36 may be operable to receive information from the transmission 28 (e.g., transmission input speed), and utilize that information to determine whether a stall condition exists. If the controller 36 finds a stall condition, then the controller may control the power source 26 to reduce the engine speed to emulate an engine lug and provide feedback (e.g., audible feedback) to the operator via an operator interface (within the operator station 10) of the work machine 2 to convey the engine lug, as described further below in FIG. 3.

In at least some embodiments, the controller 36 may include one or more processors, microprocessors, central processing units, on-board computers, electronic control modules, and/or any other computing and control devices known to those skilled in the art. The controller 36 may run one or more software programs or applications stored in a memory location, read from a computer readable medium, and/or accessed from an external device operatively coupled to the controller by any suitable communications network.

Figure 3:
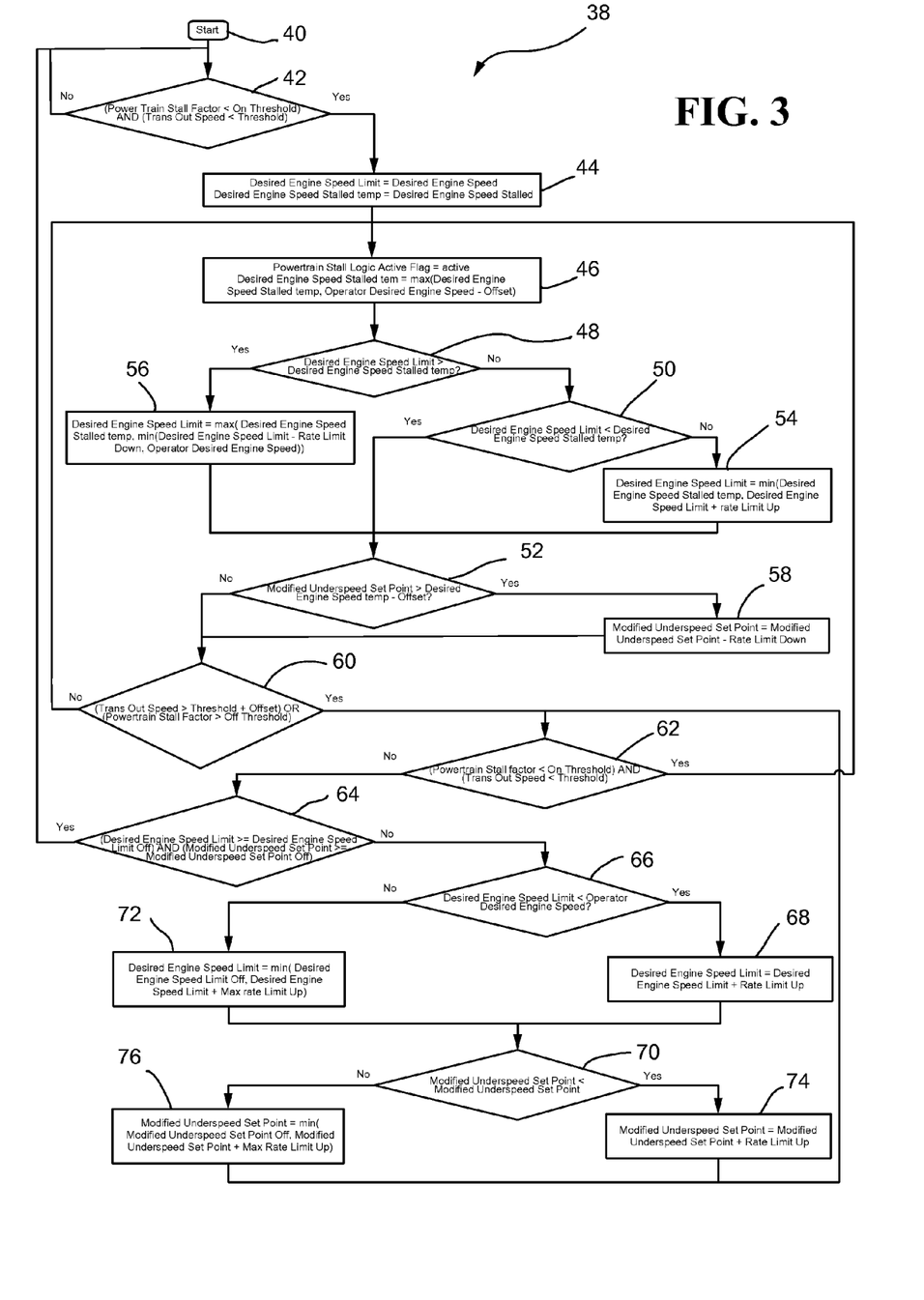
FIG. 3 is an exemplary flowchart outlining a control logic implemented by the control system of FIG. 2 during a stall condition.

Referring now to FIG. 3, an exemplary flowchart 38 outlining the control logic implemented by the controller 36 for controlling engine speed is shown, in accordance with at least some embodiments of the present disclosure. When the work machine 2 encounters a stall condition, the controller 36 may operate in three modes, namely, not active mode, active on-coming mode and off-going mode. In the not active mode, the controller 36 may determine whether a stall condition exists and if affirmed, the controller may switch to the active on-coming mode and activate the control logic, described below. If the controller 36 does not find a stall condition, the controller may remain in the not active mode until a stall condition is found. In the off-going mode, the controller 36 may prepare the engine and other powertrain components for exiting from the stall condition from the active on-coming mode and going back to the not active mode. All of the three modes of operation of the controller 36 are described in greater detail below. A stall condition may be described as a condition of the work machine 2 when it substantially comes to a standstill or is otherwise brought to a stop by, for example, hitting an object.

In order to determine a stall condition as well as to implement the control logic and operate in the three modes described above, the controller 36 may receive a plurality of inputs (e.g., from the sensors 34) and generate a plurality of outputs, at least some of which are described below. For purposes of explanation only, the names of inputs received by the controller 36 and the outputs generated therefrom are placed within "< >." For example, the controller 36 may receive <forward drive pressure> and <reverse drive pressure> readings from pressure sensors of the forward and the reverse drives, respectively, of the transmission 28. As will be described below, the forward and the reverse drive pressures may be employed to calculate a stall factor for determining whether a stall condition exists. The controller may also receive a <transmission input speed> from the transmission input speed sensor of the transmission 28 that may be used along with the aforementioned stall factor to determine the stall condition.

The controller 36 may further receive readings from the engine speed sensor regarding the <actual engine speed> of the engine (e.g., the power source 26). In at least some embodiments, the engine speed may be defined as the speed in revolutions per minute (RPM) at which the crankshaft of the engine is rotating. Additionally, the controller 36 may receive a <desired engine speed> and an <operator desired engine speed>, both of which may be employed to reduce the <actual engine speed> during a stall condition. In other words, the <actual engine speed> may be a function of the engine's overall <desired engine speed> and the amount of load that is currently being applied to the flywheel (e.g., torque). On the other hand, the <desired engine speed> may be the speed that the engine believes the <actual engine speed> should be. In at least some embodiments, the <desired engine speed> may be a function of the desired engine speeds of all of the functions on the work machine 2, including the <operator desired engine speed>. The <operator desired engine speed> may be based upon the speed desired by actuating the foot pedal in the operator station. As an example, even though an operator may be asking for, say, 1600 RPM, there may be functions or features on the work machine 2 that may instruct the engine to operate down at 1400 RPM. In this case, the <operator desired engine speed> is 1600 RPM and the <desired engine speed> is only 1400 RPM.

Several other inputs, as well as flags, which are described below, may be received by the controller 36. Based upon the inputs and the control logic, the controller 36 may output a <desired engine speed limit> value, which may then be employed to reduce the <actual engine speed> during a stall condition, a <stall logic active flag> stating whether the control logic is active or not and a <modified underspeed set point> defining how low the <actual engine speed> can go during the stall condition.

Turning now to the flowchart 38, the process starts at a step 40 in the not active mode and proceeds to a step 42 where the controller 36 determines whether a stall condition exists. As mentioned above, the controller 36 may first calculate a stall factor. The stall factor may be a value between zero (0) and one (1) to determine how close the drive pressure reading (from the sensors 34) of the transmission 28 is to an electronic pressure override (ePOR) reading. The ePOR reading specifies the maximum pressure that the forward and the reverse drives may be controlled to and may be pre-programmed within the controller 36 or alternatively, the controller may receive the ePOR reading as an input from the operator. The drive pressure that is used to calculate the stall factor may either be the forward drive pressure or the reverse drive pressure depending on the direction (forward or reverse) in which the work machine 2 is moving. Upon comparing the drive pressure to the ePOR, the controller 36 may determine the stall factor value between zero (0) and one (1). A stall factor of or close to one (1) may indicate that the drive pressure reading is far away from the ePOR reading, while a stall factor of or close to zero (0) may indicate that the drive pressure is at or close to the ePOR reading.

A factor of or close to zero (0) may indicate a stall condition. Specifically, the stall factor may be compared against an <on threshold> value that determines when to activate the control logic and switch over to the active on-coming mode from the not active mode. The <on threshold> value may be a tunable value input either by the operator or pre-determined and pre-programmed within the controller 36. If the stall factor is less than the <on threshold> value (e.g., if the stall factor is closer to zero), then it may indicate a stall condition.

In addition to the stall factor above, the controller 36 may determine whether the ground speed of the work machine 2 is low (e.g., zero or close to zero). To make such a determination, the controller 36 may compare the <transmission input speed> with a speed <threshold> value. Similar to the <on threshold> value, the speed <threshold> value may be pre-determined and/or pre-programmed within the controller 36. If the <transmission input speed> is less than the speed <threshold> value, then the controller 36 may make a determination that the ground speed of the work machine 2 is low.

Thus, if the stall factor is less than the <on threshold> value and the <transmission input speed> is less than the speed <threshold> value, the controller 36 may make a determination that a stall condition is present. In other words, a high drive pressure of the transmission 28 and a low ground speed of the work machine 2 may cause a stall condition. Accordingly, if at the step 42, the controller 36 finds a stall condition, the process proceeds to a step 44. Otherwise, the process stays at the step 42 until the controller detects a stall condition. The step 42 corresponds to the not active mode of the controller 36.

At the step 44, the controller 36 may set some initial values in order to reduce the <desired engine speed limit> in the stall condition for emulating an engine lug. For example, the controller 36 may set the <desired engine speed limit> value (which is the output from the controller) equal to the <desired engine speed> (which as described above is an input into the controller 36). Additionally, the controller may set a temporary variable, namely, <desired engine speed stalled temp>, and equal it to a <desired engine speed stalled> variable, which specifies a target output engine speed (e.g., target desired engine speed limit) for the work machine 2. The <desired engine speed stalled> value may be pre-determined and pre-programmed into the controller 36 or alternatively, it may be input by the operator depending upon the operating condition of the work machine 2.

After setting the initial values for the <desired engine speed limit> and <desired engine speed stalled temp>, the process proceeds to a step 46. At this point, the controller 36 switches over to the active on-coming mode and the stall control logic is set to active. This is indicated by setting the <stall logic active flag> to be active. A flag notification may be provided to the operator on an operator display interface within the operator station 10. Furthermore, the controller 36 may actively monitor and reduce the <desired engine speed limit> to below a certain threshold in order to emulate an engine lug and provide audible feedback to the operator.

Specifically, the controller 36 continuously refines the <desired engine speed stalled temp> value in a manner described below until the <desired engine speed limit> is below a certain threshold. Thus, at the step 46, the <desired engine speed stalled temp> value may be set to the higher of the <desired engine speed stalled temp> and the difference of the <operator desired engine speed> and an <offset>. The <offset> may be a tunable value specifying how far below the <desired engine speed> the <desired engine speed limit> can go.

Next, at a step 48, the controller 36 may determine whether the <desired engine speed limit> is greater than the <desired engine speed stalled temp>. If no, then the process proceeds to a step 50 where the controller may determine if the <desired engine speed limit> is less than the <desired engine speed stalled temp>. If the <desired engine speed limit> is indeed less than <desired engine speed stalled temp>, then the process proceeds to step 52. On the other hand, if at the step 50, the controller determines that the <desired engine speed limit> is not less than <desired engine speed stalled temp>, then at a step 54, the controller 36 sets the <desired engine speed limit> to a minimum of the <desired engine speed stalled temp> and the sum of the <desired engine speed limit> and a <rate limit up>. The <rate limit up> defines how quickly the <desired engine speed limit> may rise in each cycle. The <rate limit up> may be based upon the stall factor calculated by the controller 36 above and may be defined in terms of engine speed/second. The value of the <rate limit up> may be tuned into the controller 36 or alternatively, it may be input by the operator. After setting the value of <desired engine speed limit>, the process proceeds to the step 52.

On the other hand, if at the step 48, the controller 36 determined that the <desired engine speed limit> was greater than the <desired engine speed stalled temp>, then at a step 56, the controller assigns the <desired engine speed limit> a value that is a maximum of (<desired engine speed stalled temp>, minimum of ((difference between <desired engine speed limit> and rate limit down), <operator desired engine speed>). Similar to the <rate limit up>, the <rate limit down> is a tunable value that defines how quickly and how much the <desired engine speed limit> may reduce in each cycle. The process then proceeds to the step 52. Thus, in the steps 46-56, the <desired engine speed limit> is actively reduced below a threshold value. Reduction of the engine speed does not, depending upon the power capability of the engine (e.g., lug curve), negatively impact available power on the work machine 2 (e.g., constant power back to a fairly low engine speed), but does give the operator feedback (e.g., audible feedback) about how the work machine 2 is performing. The feedback is similar to the engine lug feedback provided by a geared transmission.

Thus, the step 52 is reached either from the step 50, the step 54 or the step 56. At the step 52, the <modified underspeed set point> is output by the controller 36. The controller 36 first determines whether the <modified underspeed set point> from the previous cycle is greater than the difference of a <desired engine speed temp> and an <offset>. The purpose of this comparison is to ensure that a gap exists between the <desired engine speed limit> and the <modified underspeed set point>, as running with a <modified underspeed set point> that is greater than the <desired engine speed limit> may result in substantially sub-par performance. Thus, if the comparison indicates that the <modified underspeed set point> is indeed greater than the difference of the <desired engine speed temp> and the <offset>, then at a step 58, the <modified underspeed set point> is set equal to the difference between the <modified underspeed set point> and <rate limit down> and the process moves to a step 60. The <desired engine speed temp> is a target speed for the control logic to control the <desired engine speed limit> to. The <offset> above may be defined as the magnitude of the gap between the <desired engine speed limit> and the <modified underspeed set point>. If not, then the process proceeds directly to the step 60 where it is determined whether the stall condition still exists or not. As the <actual engine speed> as indicated by the <desired engine speed limit> is reduced, the engine emulates an engine lug and an audible feedback is provided to the operator. By virtue of providing a feedback to the operator, the operator may be notified that the work machine 2 is doing work (e.g., pushing, pulling, digging, etc.). Without the feedback, the operator may not know whether the work machine is performing any work.

At the step 60, the controller 36 may determine whether the <transmission input speed> is greater than the sum of the <threshold> (same as the <threshold> of step 42) and an <offset> or if the <stall factor> calculated in the step 42 is greater than an <off threshold>. The <off threshold> may be defined as the value beyond which the control logic may be inactivated. More specifically, the controller 36 may determine whether the ground speed of the work machine 2 is increasing or if the drive pressure is reducing. When the <transmission input speed> is below the <threshold>, it may be possible for the transmission to be stalled. Then, when the <transmission input speed> increases above the same stalled <threshold> plus a tunable <offset>, it may be considered that the transmission is no longer stalled. This ensures that the controller is not constantly switching from stalled to not stalled with a very small change in <transmission input speed>. Thus, if either the ground speed of the work machine 2 is increasing or if the <stall factor> is getting closer to one (1), then the controller 36 may determine that the stall condition has passed (or is passing) and the controller switches into an off-going mode and proceeds to a step 62. On the other hand, if at the step 60, neither of the conditions are met (that is, the ground speed is still low or close to zero and the <stall factor> is close to zero), then the controller determines that the stall condition still exists and loops back to the step 46, where the engine speed is again actively reduced. This process of checking for the presence of a stall condition and actively reducing engine speed continues until the stall condition passes and the controller reaches the step 62.

At the step 62, the controller 36 again checks for any stall condition. The step 62 is the same as the step 42, hence it has not been described again here. If a stall condition is found at the step 62, then the controller loops back to the step 46. Otherwise, at a step 64, the controller 36 ramps up the <actual engine speed> of the work machine 2. As the engine speed is ramped up, the engine lug feedback emulated by the controller (due to reducing the engine speed) is reduced. In order to ramp up the engine speed, the controller 36 determines whether the <desired engine speed limit> is greater than or equal to a <desired engine speed limit off> and the <modified underspeed set point> is greater than a <modified underspeed set point off>.

The <desired engine speed limit off> and the <modified underspeed set point off> may be defined as thresholds that may be programmed within the controller 36 to determine whether the engine speed of the work machine 2 has been ramped up back to a normal value. Thus, if the two conditions of the step 64 are met, indicating that the engine speed has been ramped up to normal operating conditions, then the controller loops back to the step 42 and waits for a stall condition to occur. On the other hand, if either of the two conditions of the step 64 are not met, indicating that the engine speed has not ramped back up, then the controller 36 incrementally ramps up the engine speed in steps 66-76, as described below.

Specifically, at the step 66, the controller 36 determines whether the <desired engine speed limit> is less than the <operator desired engine speed>. If so, the process proceeds to a step 68, where the controller 36 sets the <desired engine speed limit> equal to the sum of the <desired engine speed limit> and the <rate limit up> and proceeds to a step 70. On the other hand, if at the step 66, the <desired engine speed limit> is not less than the <operator desired engine speed>, then at a step 72, the controller 36 assigns the <desired engine speed limit> a value that is a minimum of the <desired engine speed limit off> and the sum of the <desired engine speed limit> and the <maximum rate limit up>. Then the process proceeds to the step 70.

At the step 70, the value of the <modified underspeed set point> is set. Specifically, it is first determined by the controller 36 whether the <modified underspeed set point> is less than an <input underspeed set point>. If so, then at a step 74, the <modified underspeed set point> is set equal to the sum of the <modified underspeed set point> from the previous cycle and the <rate limit up>. The controller then loops back to the step 62 and enters the not active state and waits for a stall condition to happen again. If at the step 74, the <modified underspeed set point> is not less than an <input underspeed set point>, then at a step 76, the controller 36 sets the <modified underspeed set point> equal to a minimum of the <modified underspeed set point off and the sum of the <modified underspeed set point off> and the <maximum rate limit up>. Then again, the controller loops around to the step 62 to check if another stall condition has occurred since the ramp up procedure started. If it has not, then it checks to see if the output values (both <modified underspeed set point> and <desired engine speed limit>) have been ramped up to the "off" values. If they have, then the process resets back up to step 42 and waits for a stall event. If they have not yet reached the "off" values, then the process tries to increase them again. This repeats until the values are both at their "off" values, at which time the control loops back to the step 42 and watches for another stall event to occur. When the algorithm is not active, the output values (both <modified underspeed set point> and <desired engine speed limit>) are set to "off" values. These values are higher than the maximum possible values that would be considered normal operation. For example, if the operator can only ever reach a maximum desired engine speed of, say, 1800 RPM, then the "off" values may be set to be something higher than 1800 RPM to ensure that the control never inadvertently reduces the <operator desired engine speed>.

Thus, the controller first determines a stall condition and upon determining the stall condition, the controller actively reduces the engine speed of the work machine to emulate an engine lug. The engine lug provides a feedback to the operator and conveys to the operator that the work machine is performing to its capacity. After the stall condition passes, the controller ramps up the engine speed back to normal operating conditions and waits for another stall condition to occur.

INDUSTRIAL APPLICABILITY

In general, the present disclosure sets forth a control system having a power source and a hydrostatic transmission operatively coupled to the power source in a work machine. The control system further includes a plurality of sensors and a controller that receives information from the plurality of sensors and actively controls the power source (e.g., the engine). Specifically, the controller of the control system determines when a stall condition occurs and upon determining the stall condition, the controller emulates an engine lug of a geared transmission to provide feedback to the operator, thereby giving the operator a sense that the work machine is working to its full capacity. As described above, a stall condition may be encountered when the work machine hits an inanimate object or is otherwise brought to a substantial halt. By virtue of reducing the engine speed to emulate the engine lug, the available power on the work machine is not affected and the work machine may continue to operate at its full power capacity. When the stall condition has passed, the controller may ramp the speed of the work machine back to normal operating conditions.

While only certain embodiments have been set forth, alternatives and modifications will be apparent from the above description to those skilled in the art. These and other alternatives are considered equivalents and within the spirit and scope of this disclosure and the appended claims.

What is claimed is:

1. A control system for a work machine, the control system comprising:
    a power source;
    a hydrostatic transmission operatively coupled to the power source; and a controller configured to:
    determine whether a stall factor, relating to the hydrostatic transmission, is less than a first threshold value,
    determine whether a ground speed of the machine is less than a second threshold value,
    determine whether the work machine is experiencing a stall condition based on determining whether the stall factor is less than the first threshold value and determining whether the ground speed of the machine is less than the second threshold value,
    the work machine experiencing the stall condition when the stall factor is less than the first threshold value and the ground speed of the machine is less than the second threshold value, and
    actively and continuously control an engine speed of the work machine to reduce the engine speed below a threshold value and to provide an audible feedback to an operator of the work machine during the stall condition,
    the audible feedback indicating, to the operator, that the work machine is performing at capacity.

2. The control system of claim 1, further comprising at least one sensor capable of receiving information from the power source and the hydrostatic transmission and conveying the information to the controller.

3. The control system of claim 1, wherein the controller calculates the stall factor based on a drive pressure reading from the hydrostatic transmission to determine the stall condition.

4. The control system of claim 1, wherein to determine the stall factor, the controller receives the drive pressure reading from the hydrostatic transmission and assigns a value between zero and one to the stall factor.

5. The control system of claim 3, wherein the controller determines that the stall condition is present if the stall factor is less than an electronic pressure override value and a ground speed of the work machine is less than the second threshold value.

6. The control system of claim 1, wherein the audible feedback, indicates to the operator of the work machine, that the work machine is at least one of pushing, pulling, or digging.

7. The control system of claim 1, wherein the controller is capable to operate in a not active mode, an active on-going mode and an off-going mode.

8. The control system of claim 1, wherein the controller emulates a geared transmission.

9. The control system of claim 1, wherein the reduction in the engine speed does not reduce available power on the work machine.

10. A method of operating a work machine in a stall condition, the method comprising:
    providing an engine operatively coupled to a transmission; providing a controller capable of receiving information from the engine and the transmission;
    determinings by controller, whether a stall condition exists, determining whether the stall condition exists including:
    determining a stall factor indicative of a drive pressure reading of the transmission, and
    determining a ground speed of the work machine;
    reducing a speed of the engine below a threshold value, if the stall condition exists, to provide an audible feedback to an operator of the work machine;
    the audible feedback indicating, to the operator, that the work machine is performing at capacity: determining whether the stall condition has passed; and
    ramping the speed of the engine back to a normal operating condition when the stall condition has passed.

11. The method of claim 10, wherein the stall factor is indicative of how close the drive pressure reading of the transmission is to an electronic pressure override (ePOR) reading.

12. The method of claim 10, wherein determining the stall condition comprises determining a transmission input speed of the transmission.

13. The method of claim 10, wherein a stall condition exists if a drive pressure of the transmission is greater than a first threshold value and a ground speed of the work machine is below a second threshold.

14. The method of claim 10, wherein reducing the speed of the engine includes actively controlling the speed of the engine.

15. The method of claim 14, wherein the audible feedback indicates that the work machine is at least one of pushing, pulling, or digging.

16. A work machine, comprising: an engine;
    a hydrostatic transmission;
    a plurality of sensors capable of receiving information from the engine and the transmission; and
    a controller configured to:
    receive information from the plurality of sensors, determine a stall factor relating to the transmission, determine a ground speed of the work machine;
    determine whether a stall condition exists based on determining the stall factor relating to the transmission and determining the ground speed of the work machine;
    reduce a speed of the engine, during the stall condition, below a threshold value, to provide an audible feedback to an operator of the work machine;
    the audible feedback indicating, to the operator, that the work machine is performing at capacity,
    determine whether the stall condition has passed, and ramp up the speed of the engine when the stall condition has passed.

17. The work machine of claim 16, wherein the stall condition exists when the stall factor is less than a first threshold and a transmission input speed is less than a second threshold.

18. The work machine of claim 16, wherein the stall condition is said to have passed when either the stall factor is greater than an off threshold or a transmission input speed is greater than the sum of an on threshold and an offset.

19. The work machine of claim 16, wherein the controller remains in a not active mode when no stall condition exists, in an active on-coming mode when the stall condition exists and an off-going mode when the controller exits from the active on-coming mode.

20. The work machine of claim 19, wherein the controller outputs a flag indicating when the controller is in the active on-coming mode.

* * * * *